(No Model.)

A. B. SHAW.
CURTAIN FIXTURE

No. 260,616. Patented July 4, 1882.

Witnesses:
C. L. Keyes
Jeremiah R. Callahan

Inventor:
A. B. Shaw
by A. N. Jenien
his attorney.

UNITED STATES PATENT OFFICE.

AI B. SHAW, OF MEDFORD, MASSACHUSETTS.

CURTAIN-FIXTURE.

SPECIFICATION forming part of Letters Patent No. 260,616, dated July 4, 1882.

Application filed November 10, 1881. (No model.)

*To all whom it may concern:*

Be it known that I, AI B. SHAW, a citizen of the United States, residing at Medford, in the county of Middlesex and State of Massachusetts, have invented certain new and useful Improvements in Curtain-Fixtures; and I do hereby declare that the same are fully described in the following specification and illustrated in the accompanying drawings.

The object of this invention is to facilitate the measurement or the determination of the proper point of cutting off curtain-rollers and shade-slats, and thus to avoid the annoyance and waste of time incident to the ordinary methods of such calculations in putting up curtain-fixtures, all forms of rollers being furnished of greater length than will be required in use, and hence requiring to be cut to fit a particular window.

Spring curtain-fixtures, as usually constructed, have at one end a projecting spindle to engage with one bracket, and at the other end a cap or pivot-piece entering or entered by the other bracket. The brackets are to be mounted in a particular position on the window-frame, and since the extent of projection of the spindle and pivot-piece are additional to the length of the roller proper, and such projection is partially within the brackets, it becomes quite a problem just where to cut off the roller so that when the end-cap or pivot-piece is nailed on the pivot at one end and the spindle-notch at the other will just coincide with the brackets. Laborious and often inaccurate measurements usually accompany the attempt to cut the roller at the proper point and allow suitable play for free rotation. I obviate this difficulty by affixing to the roller or slat a scale of measurements in inches and fourths, which measurements indicate not the length of the roller only, but also allow for the projection of the spindle at one end and the pivot or end block at the other. Hence when the bracket-measure or the distance between the outsides of the brackets is known in inches and fractions thereof, rollers having my improvement may, without any measuring or calculation, be correctly cut at once at the point indicated by the scale as denoting the given inches and fractions. The series of dots marking the fractions of inches being arranged in a straight line also serves as a line by which to tack the shade to the roller.

Figure 1:
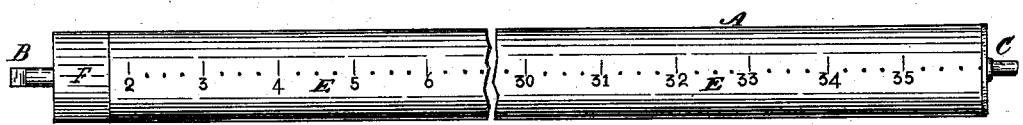
Figure 2:
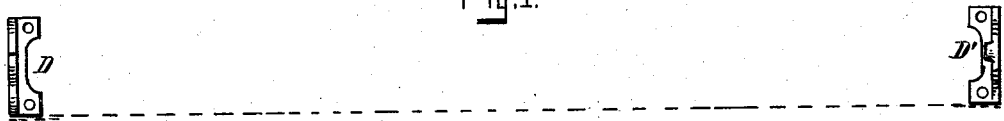

In the drawings, Figure 1 represents a roller with my improvement applied thereon. Fig. 2 shows the same scale applied to the bottom slat.

A is the roller; B, the end of the spindle, projecting, as usual, from the roller, and C the bearing or pivot plate at the other end. D D' are the brackets, fixed at a given distance from each other on the window-casing, and having recesses to receive respectively the spindle end B and the pivot C. F is the ferrule. E is the graduated scale in inches, denoted by figures, and fractions thereof by dots printed, stamped, or painted directly upon the wooden roller, or on a strip of paper applied thereto.

By reference to the drawings it will be observed that the scale does not begin with a full-measured two inches, but with a fractional part thereof, the missing portion representing the thickness of the brackets and the projection of the spindle and pivot-plate, from roller end to bracket.

It is obvious that when allowance is made for these parts before beginning to lay off the scale upon the roller itself, the measurements made thereon will correspond with those denoting the full width of space which the fixture is to occupy on the window-casing, and the roller cut to such scale-measurement will be of proper length. For instance, if the "bracket-measure" on the casing shows a space of thirty-six inches to be filled, the roller is to be cut at the scale-mark 36 without regard to the fact that the actual length of the wooden roller is less.

Different styles of fixtures having spindles, brackets, and pivots of various dimensions, it is necessary for the manufacturer, in applying the scale as a cutting-guide, to allow more or less, as the case may be, for space taken up by the metallic parts and for the desired play. The dots, denoting fractions of an inch, arranged in a straight line, as shown, form a correct guide in tacking on the end of the shade. Numbers need not be applied below twelve or fifteen inches, as no shades are required of less width than that.

The slat G (shown in Fig. 2) has the same allowances made in laying out the scale, and may be used in cutting the roller to proper length by laying them side by side, with the ends of the spindle and slat even, and cutting the roller at a point opposite the figures on the slat denoting the bracket-measure.

I claim as of my invention—

As a new article of manufacture, a shade roller or slat provided with a graduated scale of measurements as a guide in cutting and fitting to windows, substantially as and for the purpose set forth.

In testimony whereof I hereto affix my signature in presence of two witnesses.

AI B. SHAW.

Witnesses:
A. H. SPENCER,
E. A. PHELPS.